(12) United States Patent
Lv et al.

(10) Patent No.: US 10,604,885 B2
(45) Date of Patent: Mar. 31, 2020

(54) FILTERING SYSTEM WITH SELF-CLEANING FUNCTION AND CLOTHES DRYER

(71) Applicant: QINGDAO HAIER WASHING MACHINE CO., LTD., Qingdao, Shandong Province (CN)

(72) Inventors: Peishi Lv, Qingdao (CN); Sheng Xu, Qingdao (CN); Huacheng Song, Qingdao (CN); Shiqiang Shan, Qingdao (CN)

(73) Assignee: QINGDAO HAIER WASHING MACHINE CO., LTD., Qingdao (CN)

( * ) Notice: Subject to any disclaimer, the term of this patent is extended or adjusted under 35 U.S.C. 154(b) by 164 days.

(21) Appl. No.: 15/564,257

(22) PCT Filed: Nov. 27, 2015

(86) PCT No.: PCT/CN2015/095743
§ 371 (c)(1),
(2) Date: Oct. 4, 2017

(87) PCT Pub. No.: WO2016/165341
PCT Pub. Date: Oct. 20, 2016

(65) Prior Publication Data
US 2018/0135233 A1   May 17, 2018

(30) Foreign Application Priority Data

Apr. 14, 2015   (CN) .......................... 2015 1 0173226

(51) Int. Cl.
*F26B 3/00*   (2006.01)
*D06F 58/22*   (2006.01)
(Continued)

(52) U.S. Cl.
CPC ......... *D06F 58/22* (2013.01); *B01D 46/0012* (2013.01); *B01D 46/0065* (2013.01);
(Continued)

(58) Field of Classification Search
CPC . D06F 58/22; B01D 46/4245; B01D 46/0065; B01D 46/10; B01D 46/48
(Continued)

(56) References Cited

U.S. PATENT DOCUMENTS 3,555,785 A * 1/1971 Wooldridge et al. ....................... B01D 46/0065 55/283
4,314,409 A   2/1982 Cartier et al.
(Continued)

FOREIGN PATENT DOCUMENTS

CN   203123721 U * 8/2013

*Primary Examiner* — John P McCormack
(74) *Attorney, Agent, or Firm* — Jiwen Chen; Jacobson Holman PLLC

(57) ABSTRACT

A filter system with self-cleaning function and a clothes dryer using the filter system, wherein the filter system comprises a shell 5 with an air inlet 12 and an air outlet 13, a filter system screen 7, a cleaning unit 3, a driving device and a lint collection drawer 8, wherein the driving device includes a drive motor 1 disposed on the outer wall of the shell 5 and a screw rod 2 disposed inside the shell 5, the output shaft of the drive motor 1 passes through the small hole I 14 opened on the shell 5 and extends inside the shell; one end of the screw rod 2 is engaged with the output shaft of the drive motor 1 and the other end of the screw rod 2 is mounted inside the small hole II 15 opened on the wall of the shell 5 opposite to the output shaft of the drive motor. The cleaning unit 3 is screwed on the screw rod 2 and driven by the screw rod 2 to move back and forth and the lower end of the cleaning unit 3 is in contact with the filter system screen 7, and the automatic self-cleaning lint function could
(Continued)

be achieved. For the clothes dryer, the overall structure becomes more compact and reliable by improving structure of the filter system, and the lint collection efficiency and also drying efficiency are increased.

11 Claims, 2 Drawing Sheets

(51) Int. Cl.
    *B01D 46/00*     (2006.01)
    *B01D 46/10*     (2006.01)
    *B01D 46/42*     (2006.01)
    *B01D 46/48*     (2006.01)
    *D06F 58/02*     (2006.01)

(52) U.S. Cl.
    CPC ......... *B01D 46/0084* (2013.01); *B01D 46/10* (2013.01); *B01D 46/4245* (2013.01); *B01D 46/48* (2013.01); *B01D 2273/26* (2013.01); *D06F 58/02* (2013.01)

(58) Field of Classification Search
    USPC ...................................................... 34/480, 82
    See application file for complete search history.

(56) References Cited

U.S. PATENT DOCUMENTS

| | | | |
|---|---|---|---|
| 4,462,170 A | 7/1984 | Burkall et al. | |
| 2015/0337483 A1* | 11/2015 | Ramprasad | D06F 58/22 34/480 |

* cited by examiner

FILTERING SYSTEM WITH SELF-CLEANING FUNCTION AND CLOTHES DRYER

This is a U.S. national stage application of PCT Application No. PCT/CN2015/095743 under 35 U.S.C. 371, filed Nov. 27, 2015 in Chinese, claiming priority of Chinese Application No. 201510173226.6, filed Apr. 14, 2015, all of which are hereby incorporated by reference.

FIELD OF THE INVENTION

The present invention relates to a clothes dryer, and more particularly to a filter system for clothes dryer, and specifically, relates to improvement on the structure of lint cleaner with filter.

BACKGROUND OF THE INVENTION

With the improvement of people's living standards, dryers have been widely used, and the drying function has also been added on traditional washing machine. The clothes dryer includes a drum, a housing containing the drum, a filter, an air duct, heating members and the like. The air inlet of the filter system is connected to the air outlet of the drum. The outlet of the filter system has two different forms depending on the type of the dryer. One is for the straight-line dryer that is directly connected to the exhaust pipe and the other is for the one with an outlet connected to a condenser, and heat pump dryers and the like.

In the existing dryer, a filter screen is normally provided at the outlet of the drum to prevent lint from flowing into the condenser or into external environment. The lint needs to be cleaned by manual work in most types of the dryers. Normally, the filter system needs to be removed by people after drying. If debris on the filter system could not be completely cleaned multiple times, the effect of drying will getting worse and the energy consumption will rising up. Another disadvantage caused by accumulated lint is that the air outlet is being blocked and air cannot flow out smoothly, thus the temperature in the drum increase and damage clothes.

An automatic filter system able to clean lint is disclosed in Chinese patent application, CN102535130A, in which the filter system includes a driving unit, a filter system screen, a cleaning unit and a collection unit, wherein the driving unit makes the filter system move, the cleaning unit is arranged in contact with the surface of the filter system to remove the lint on the filter system surface, and the removable collection unit is arranged below the filter. The crawler-type filter system fits over the driving shaft and the universal driving shaft and the cleaning unit is a brush or a scraper.

Technical Problem

Although the structure disclosed in the application has a function to automatically remove the debris, but it occupied a large space and meanwhile the crawler-type filter system needs to withstand a certain tension and the force will exert a negative effect on the service life of the filter system screen.

BRIEF DESCRIPTION OF THE INVENTION

The present invention discloses a filter system with self-cleaning function and a dryer with the filter system to overcome the shortcomings of the prior art mentioned above.

The object of the present invention is to achieve the automatic cleaning of lint and debris based on a novel driving unit of the filter system used in dryer. The filter system has a more compact structure and a higher reliability compared with the prior art.

In order to achieve the object, the following technical solution is used in the present invention.

A filter system with self-cleaning function comprises a shell with an air inlet and an air outlet, a filter system screen, a cleaning unit, a driving device and a lint collection drawer, wherein the driving device includes a drive motor disposed on the outer wall of the shell and a screw rod disposed inside the shell, the output shaft of the drive motor passes through the small hole I opened on the shell and extends inside the shell. One end of the screw rod is engaged with the output shaft of the drive motor and the other end of the screw rod is mounted inside the small hole II opened on the wall opposite to the output shaft of the drive motor. The cleaning unit is screwed on the screw rod and driven by the screw rod to move back and forth and the lower end of the cleaning unit is in contact with the filter system screen.

Further, a bearing is provided within the small hole II, and the screw rod is mounted in the bearing within the small hole II.

The screw rod is arranged adjacent to the front wall of the shell and a slide rail is disposed on the rear wall of the shell. The front end of the upper portion of the cleaning unit is engaged with the screw rod, and the rear end the upper portion of the cleaning unit is installed inside the slide rail. Further, the rear end of the upper portion of the cleaning unit is provided with a bearing and rolling friction is formed between the bearing and the slide rail. Or the screw rod is disposed at the center of the cavity of the shell, and slide rails are arranged on the front wall and the rear wall of the shell. The middle part of the upper portion of the cleaning unit is engaged with the screw rod, and bearings are respectively arranged on the front end of the upper portion of the cleaning unit and on the rear end of the upper portion of the cleaning unit and the bearings are disposed in the side rails.

The part of the cleaning unit being in contact with the filter system is a brush, or made of silicone, or a rubbery brush.

A lint collection plate is arranged above the lint collection drawer. A stepping motor used to control the opening and closing of the lint collection plate is further provided on the outer wall of the shell. Or the lint collection plate is arranged above the lint collection drawer, and a return spring is installed on the lint collection plate, wherein the lint collection plate is opened under the force of gravity and closed under the force provided by the return spring.

A photoelectric sensor is arranged inside the lint collection drawer, wherein the transmitting end and the receiving end of the photoelectric sensor are respectively installed on the left side wall and on the right side wall of the lint collection collecting drawer. Under the condition that no signal is being received by the receiving end, flicker light or voice signal could be generated to make the user alert to the fact that the lint collection drawer needs to be cleaned.

The present invention also relates to a clothes dryer, the clothes dryer comprises a drum, a housing containing the drum, a filter system, an air duct, a heating member, and a control system, wherein the filter system is the filter system with self-cleaning function described above in detail.

According to the above-described technical solution, the clothes dryer having the structure of the self-cleaning filter system of the present invention can realize the function of automatically cleaning the lint with compact structure, high strength and good reliability. The alerting function makes the clothes dryer more consumer-friendly.

BRIEF DESCRIPTION OF THE DRAWINGS

The invention will now be described in detail with reference to the accompanying drawings and specific embodiments.

Figure 1:
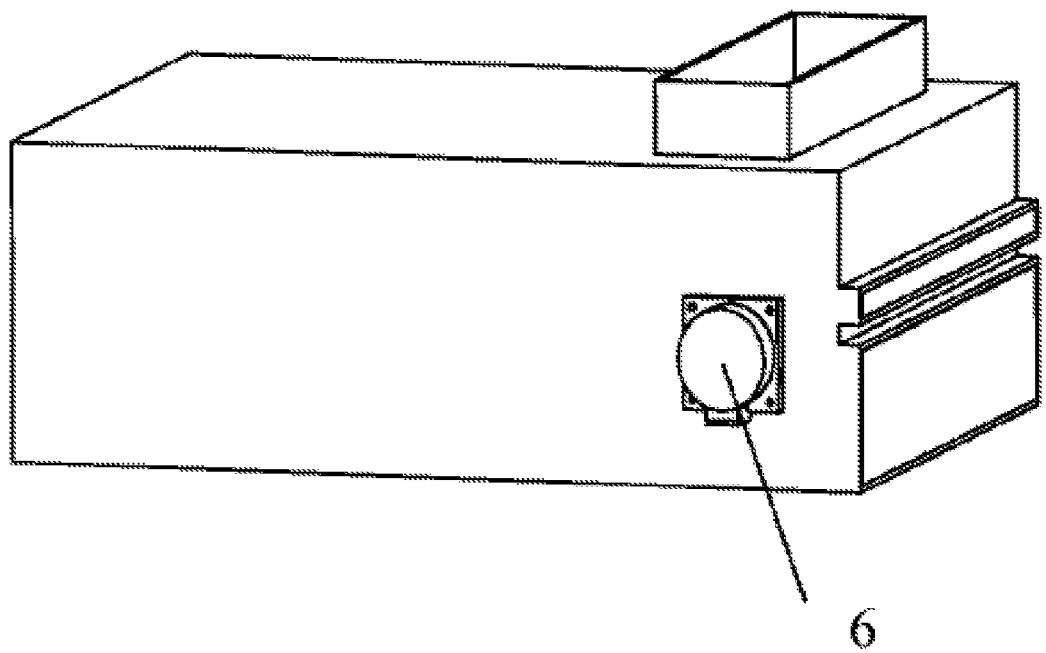
FIG. 1 is an external view of the filter system with self-cleaning function according to the present invention.

Elements are indicated by reference numbers are:

drive motor 1, screw rod 2, cleaning unit 3, slide rail 4, shell 5, stepping motor 6, filter system screen 7, lint collection drawer 8, lint collection plate 9, means for installing the filter system screen 10, means for installing the lint collection drawer 11, air inlet 12, air outlet 13, small hole I 14, small hole II 15.

DETAILED DESCRIPTION OF THE INVENTION

Embodiment I

Figure 2:
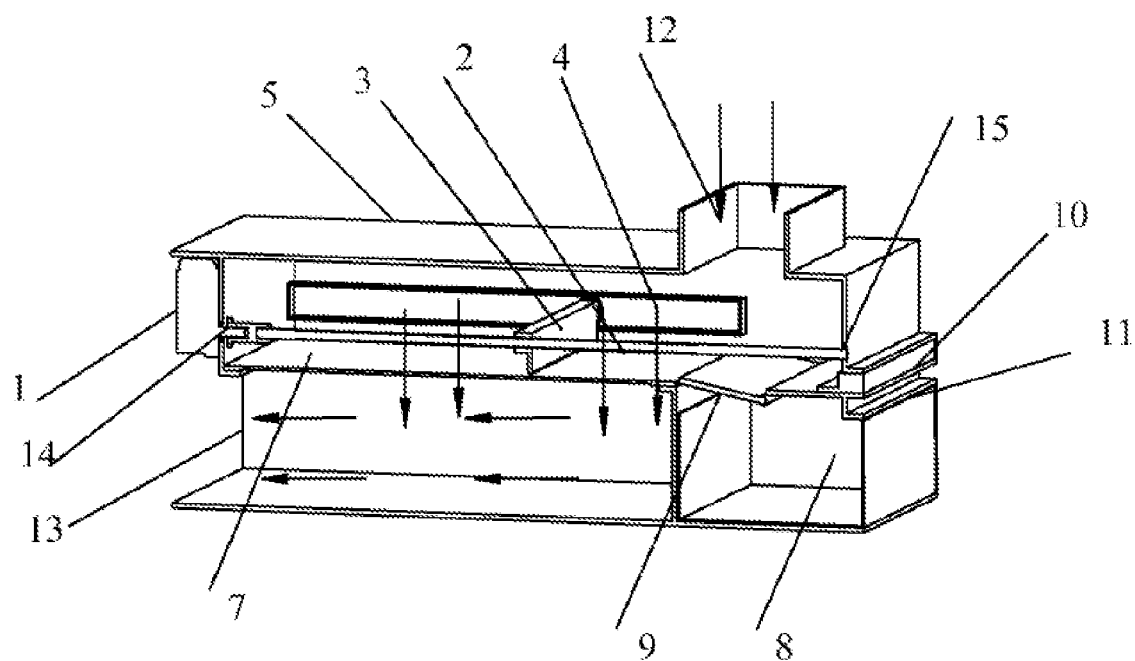
FIG. 2 is a cross-sectional view showing the working state of the filter system with self-cleaning function of the present invention.
Figure 3:
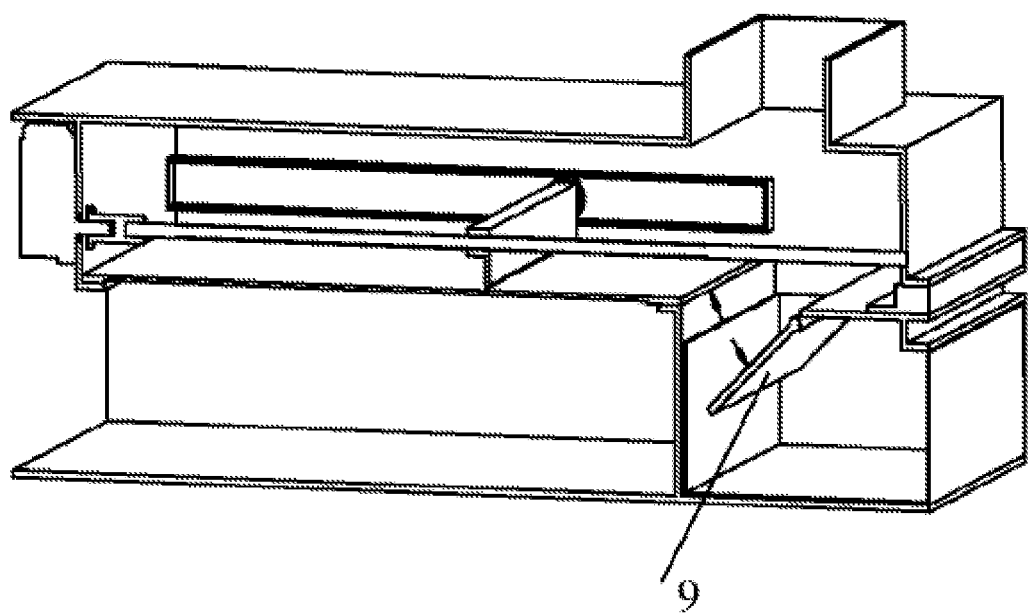
FIG. 3 is a cross-sectional view showing the opening state of the lint collection plate of the filter system with self-cleaning function of the present invention.

Referring to FIG. 1 to FIG. 3, the technical solution of the preferred embodiment of the present invention will be described in detail.

The filter system with self-cleaning function according to the present invention comprises a shell 5 having an air inlet 12 and an air outlet 13, a small hole I 14 is opened on the left side wall of the shell 5 and a drive motor 1 is arranged on the outer wall. The power output shaft of the drive motor 1 passes through the small hole I and extends into the inside of the shell 5. A small hole II 15 is opened on the right side wall of the shell 5 at the position corresponding to the small hole I. One end of the screw rod 2 is engaged with the output shaft of the drive motor 1, and the other end of the screw rod 2 is mounted on the small hole II opened on the wall of the shell opposite to the output shaft of the drive motor. In order to reduce the friction between the screw rod 2 and the small hole II, the hole II is fitted with a bearing, and the right end of the screw rod 2 is inserted into the bearing.

The screw rod 2 in the shell 5 of this embodiment is adjacent to the front wall of the shell, and a slide rail 4 is provided on the rear wall at a height corresponding to the screw rod 2. The front end of the cleaning unit 3 is screwed to the screw rod 2, and the rear end of the cleaning unit 3 is placed in the slide rail 4, and further, in order to reduce the friction between the cleaning unit 3 and the slide rail 4, the rear end of the upper portion of the cleaning unit 3 is provided with a bearing.

The lower portion of the cleaning unit 3 is in contact with the filter screen 7 and the contact part uses a brush, or is made of silicone, or uses a rubber brush to effectively clean the lint without damaging the filter system screen.

FIG. 2 shows the working state of the filter system of the present invention. Air with lint inside the drum of the clothes dryer enters the filter system from the air inlet 12 of the shell 5 and is filtered by the filter screen 7 and discharged from the air outlet 13. The lint is blocked and accumulated on the filter screen 7. The output shaft of the drive motor 1 rotates in a positive direction or in a negative position to drive the screw rod 2 engaged with to reciprocate along a liner direction. When the screw rod 2 moves along the liner direction driven by the screw rod 2, the brush on the lower part of the cleaning unit 3 clean the lint on the filter screen 7 and the lint is collected on the lint collection plate 9. As shown in the FIG. 3, the stepping motor 6 controls the opening and closing of the lint collection plate 9. When the lint collection plate 9 is opened, the lint enters into the lint collection drawer 8. Means for installing the filter system screen 10 and means for installing the lint collection drawer 11 are provided on the right side wall of the shell 5. Normally, the filter system with self-cleaning function starts to work after drying. Preferably, the filter system with self-cleaning function can be set to start work once in the middle of the drying process under the condition of being used in dryers with high capability or used for drying clothes which may produce lots of lint. The proper cleaning frequency could reduce air resistance and facilitate drying.

In the present preferred embodiment, a photoelectric sensor is mounted on the lint collection drawer, and the photoelectric sensor is disposed on one end of the lint collection drawer away from the lint collection plate. The transmitting and receiving ends of the photoelectric sensor are respectively installed on the left side wall and on the right side wall of the drawer opposite to each other. Under the condition that no signal is being received by the receiving end, it is full of lint and flicker light is displayed on the control panel of the dryer to indicate the full state, or voice are used to make the user alert to the condition. The lint collection drawer 8 can be removed from the means for installing the lint collection drawer 11 for cleaning.

Embodiment II

A second mode of the driving device of the filter system with self-cleaning function is described as follows, wherein the drive motor 1 and the screw rod 2 are arranged in the middle part of the shell, the middle part of the upper portion of the cleaning unit 3 screwed to the screw rod 2, the front side wall and the rear side wall of the shell are provided with slide rails respectively, bearings are arranged on the front end and the rear end of the upper portion of the cleaning unit and the bearings are disposed inside the front slide rail and the rear slide rail.

Embodiment III

A third mode of the driving device of the filter system with self-cleaning function is described as follows, wherein a lint collection plate is arranged above the lint collection drawer, and a return spring is mounted on the lint collection plate. The lint collection plate is being opened under the force of gravity and being closed by the return spring.

The present invention also relates to clothes dryer. The overall structure becomes more compact and reliable by improving structure of the filter system to increase the lint collection efficiency and also drying efficiency.

It could be understood that the present invention is not limited by the above-described examples. The products using the present invention comprises but not limited by roller washing machine with drying function or impeller washing machine with drying function. It is obvious to ordinary skill in the art the present disclosure are only preferred examples, and various modifications thereof not departing from the spirit and scope of the present invention may also fall within the scope of the disclosure.

The invention claimed is:

1. A filter system with self-cleaning function comprises a shell with an air inlet and an air outlet, a filter system screen, a cleaning unit, a driving device and a lint collection drawer, wherein the driving device includes a drive motor disposed on an outer wall of the shell and a screw rod disposed inside the shell, an output shaft of the drive motor passes through a small hole I opened on the shell and extends inside the shell; one end of the screw rod is engaged with the output shaft of the drive motor and the other end of the screw rod is mounted inside a small hole II opened on a wall opposite to the output shaft of the drive motor; the cleaning unit is screwed on the screw rod and driven by the screw rod to move back and forth and a lower end of the cleaning unit is in contact with the filter system screen, wherein the screw rod is disposed at the center of the cavity of the shell, and slide rails are arranged on a front wall and a rear wall of the shell; the middle part of the upper portion of the cleaning unit is engaged with the screw rod, and bearings are respectively arranged on the front end of the upper portion of the cleaning unit and on the rear end of the upper portion of the cleaning unit and the bearings are disposed on the slide rails.

2. The filter system with self-cleaning function of claim 1, wherein a bearing is provided within the small hole II, and the screw rod is mounted in the bearing within the small hole II.

3. The filter system with self-cleaning function of claim 1, wherein a part of the cleaning unit being in contact with the filter system is a brush made of silicone, or a rubbery brush.

4. A filter system with self-cleaning function comprises a shell with an air inlet and an air outlet, a filter system screen, a cleaning unit, a driving device and a lint collection drawer, wherein the driving device includes a drive motor disposed on an outer wall of the shell and a screw rod disposed inside the shell, an output shaft of the drive motor passes through a small hole I opened on the shell and extends inside the shell; one end of the screw rod is engaged with the output shaft of the drive motor and the other end of the screw rod is mounted inside a small hole II opened on a wall opposite to the output shaft of the drive motor; the cleaning unit is screwed on the screw rod and driven by the screw rod to move back and forth and a lower end of the cleaning unit is in contact with the filter system screen;
   wherein the screw rod is arranged adjacent to a front wall of the shell and a slide rail is disposed on a rear wall of the shell; the front end of the upper portion of the cleaning unit is engaged with the screw rod, and the rear end the upper portion of the cleaning unit is installed in the slide rail;
   wherein the rear end of the upper portion of the cleaning unit is provided with a bearing and rolling friction is formed between the bearing and the slide rail; and
   wherein a lint collection plate is arranged above the lint collection drawer; a stepping motor used to control the opening and closing of the lint collection plate is further provided on the outer wall of the shell.

5. The filter system with self-cleaning function of claim 4, wherein a return spring is installed on the lint collection plate, the lint collection plate is opened under the force of gravity and closed by the return spring.

6. The filter system with self-cleaning function of claim 4, wherein a photoelectric sensor is arranged inside the lint collection drawer, wherein the transmitting end and the receiving end of the photoelectric sensor are respectively installed on the left side wall and on the right side wall of the lint collection collecting drawer, under the condition that no signal is being received by the receiving end, a flicker light or voice signal may be generated to make a user alert to that the lint collection drawer needs to be cleaned.

7. A clothes dryer, comprises a drum, a housing containing the drum, a filter system, an air duct, a heating member, and a control system, wherein the filter system is the filter system with self-cleaning function of claim 1.

8. The filter system with self-cleaning function of claim 4, wherein the part of the cleaning unit being in contact with the filter system is a brush made of silicone, or a rubbery brush.

9. A filter system with self-cleaning function comprises a shell with an air inlet and an air outlet, a filter system screen, a cleaning unit, a driving device and a lint collection drawer, wherein the driving device includes a drive motor disposed on an outer wall of the shell and a screw rod disposed inside the shell, an output shaft of the drive motor passes through a small hole I opened on the shell and extends inside the shell; one end of the screw rod is engaged with the output shaft of the drive motor and the other end of the screw rod is mounted inside a small hole II opened on a wall opposite to the output shaft of the drive motor; the cleaning unit is screwed on the screw rod and driven by the screw rod to move back and forth and a lower end of the cleaning unit is in contact with the filter system screen;
   wherein a bearing is provided within the small hole II, and the screw rod is mounted in the bearing within the small hole II;
   wherein the screw rod is arranged adjacent to a front wall of the shell and a slide rail is disposed on a rear wall of the shell; the front end of the upper portion of the cleaning unit is engaged with the screw rod, and the rear end the upper portion of the cleaning unit is installed in the slide rail;
   wherein the rear end of the upper portion of the cleaning unit is provided with a bearing and rolling friction is formed between the bearing and the slide rail; and
   wherein a lint collection plate is arranged above the lint collection drawer; a stepping motor used to control the opening and closing of the lint collection plate is further provided on the outer wall of the shell.

10. The filter system with self-cleaning function of claim 9, wherein a return spring is installed on the lint collection plate, the lint collection plate is opened under the force of gravity and closed by the return spring.

11. The filter system with self-cleaning function of claim 9, wherein a photoelectric sensor is arranged inside the lint collection drawer, wherein the transmitting end and the receiving end of the photoelectric sensor are respectively installed on the left side wall and on the right side wall of the lint collection collecting drawer, under the condition that no signal is being received by the receiving end, a flicker light or voice signal may be generated to make a user alert to that the lint collection drawer needs to be cleaned.

* * * * *